United States Patent
Achor et al.

(10) Patent No.: US 7,931,448 B2
(45) Date of Patent: Apr. 26, 2011

(54) SYSTEM AND METHOD FOR MANUFACTURING A BRUSHLESS DC MOTOR FLUID PUMP

(75) Inventors: Kyle D. Achor, Monticello, IN (US); Michael S. Richards, Kokomo, IN (US)

(73) Assignee: Federal Mogul World Wide, Inc., Southfield, MI (US)

( * ) Notice: Subject to any disclaimer, the term of this patent is extended or adjusted under 35 U.S.C. 154(b) by 267 days.

(21) Appl. No.: 11/461,505

(22) Filed: Aug. 1, 2006

(65) Prior Publication Data

US 2008/0028596 A1    Feb. 7, 2008

(51) Int. Cl.
F04B 49/06 (2006.01)
F04B 17/00 (2006.01)
H02K 15/00 (2006.01)

(52) U.S. Cl. ............ 417/53; 417/410.1; 29/596; 29/732
(58) Field of Classification Search .......... 29/596, 29/606, 732, 445, 898.07, 419.2, 598; 417/410.1, 417/410.3; 310/42; 72/56
See application file for complete search history.

(56) References Cited

U.S. PATENT DOCUMENTS

| | | | |
|---|---|---|---|
| 3,165,816 A * | 1/1965 | Wightman et al. | 29/596 |
| 3,195,222 A * | 7/1965 | Rutledge | 29/596 |
| 3,268,986 A * | 8/1966 | Lacy | 29/596 |
| 3,431,625 A * | 3/1969 | Kulb et al. | 29/419.2 |
| 3,432,700 A * | 3/1969 | Diederichs | 310/42 |
| 3,439,403 A * | 4/1969 | Lippmann et al. | 29/732 |
| 3,508,327 A * | 4/1970 | Diederichs et al. | 29/596 |
| 3,555,651 A | 1/1971 | Latussek et al. | |
| 3,571,921 A | 3/1971 | Pieper | |
| 3,707,037 A * | 12/1972 | Gutris | 29/596 |
| 3,728,563 A | 4/1973 | Stone | |
| 3,755,889 A * | 9/1973 | Busian | 29/596 |
| 3,857,170 A | 12/1974 | Stoner | |
| 4,404,483 A | 9/1983 | Lebkuchner | |
| 4,505,031 A * | 3/1985 | Colwell et al. | 29/596 |
| 4,590,668 A | 5/1986 | Peachee, Jr. | |
| 4,705,974 A * | 11/1987 | White | 310/89 |

(Continued)

OTHER PUBLICATIONS

Printed Material Regarding "Maxwell Magneform Products" dated Nov. 15, 2005 (total of 12 pages).

Primary Examiner — Charles G Freay
Assistant Examiner — Alexander B Comley
(74) Attorney, Agent, or Firm — Robert L. Stearns; Dickinson Wright, PLLC

(57) ABSTRACT

A system and method for manufacturing a brushless direct current (BLDC) motor fluid pump is disclosed. The system includes an electromagnetic forming device, an upper fixture, a lower fixture, and a pneumatic or hydraulic cylinder. The electromagnetic forming device has a central cavity. The central cavity has a predefined depth from an outer surface of the electromagnetic forming device. The upper fixture is disposed in the central cavity. The upper fixture has a pump stop surface that contacts the BLDC motor fuel pump, and the pump stop surface is selectively spaced from the outer surface of the electromagnetic forming device. A lower fixture having a central cavity for receiving the housing of the BLDC motor fluid pump is provided. A cylinder is configured to move the lower fixture towards the upper fixture until the pump stop surface of the upper fixture contacts the BLDC motor fluid pump. The electromagnetic forming device is activated to seal the housing of the pump assembly once the pump assembly is properly positioned within the magneforming device.

1 Claim, 2 Drawing Sheets

U.S. PATENT DOCUMENTS

| | | | |
|---|---|---|---|
| 4,716,648 A * | 1/1988 | Nel | 29/596 |
| 4,876,492 A | 10/1989 | Lester et al. | |
| 4,934,041 A * | 6/1990 | Hoover et al. | 29/596 |
| 4,955,790 A | 9/1990 | Nakanishi et al. | |
| 4,978,282 A | 12/1990 | Fu et al. | |
| 4,998,865 A | 3/1991 | Nakanishi et al. | |
| 5,007,806 A | 4/1991 | Bellis et al. | |
| 5,015,159 A | 5/1991 | Mine et al. | |
| 5,040,286 A | 8/1991 | Stark | |
| 5,040,954 A | 8/1991 | Iwai | |
| 5,041,749 A | 8/1991 | Gaser et al. | |
| 5,053,664 A | 10/1991 | Kikuta et al. | |
| 5,072,145 A | 12/1991 | Davis et al. | |
| 5,092,748 A | 3/1992 | Simmons, II | |
| 5,096,390 A | 3/1992 | Sevrain et al. | |
| 5,120,201 A | 6/1992 | Tuckey et al. | |
| 5,144,735 A | 9/1992 | Stark | |
| 5,148,792 A | 9/1992 | Tuckey | |
| 5,231,967 A | 8/1993 | Baltz et al. | |
| 5,278,468 A | 1/1994 | Escaravage et al. | |
| 5,319,844 A * | 6/1994 | Huang et al. | 29/598 |
| 5,327,064 A | 7/1994 | Arakawa et al. | |
| 5,338,163 A | 8/1994 | Frank et al. | |
| 5,345,124 A | 9/1994 | Lang | |
| 5,353,491 A * | 10/1994 | Gentry et al. | 29/596 |
| 5,356,272 A | 10/1994 | Nagata et al. | |
| 5,368,805 A | 11/1994 | Motai | |
| 5,375,975 A | 12/1994 | Yu et al. | |
| 5,393,206 A | 2/1995 | Roth et al. | |
| 5,399,075 A | 3/1995 | Frank et al. | |
| 5,418,416 A | 5/1995 | Muller | |
| 5,420,752 A | 5/1995 | Variot | |
| 5,421,706 A | 6/1995 | Martin, Sr. | |
| 5,454,697 A | 10/1995 | Nakanishi | |
| 5,462,622 A | 10/1995 | Small et al. | |
| 5,487,650 A | 1/1996 | Gaston et al. | |
| 5,563,463 A | 10/1996 | Stark | |
| 5,570,272 A | 10/1996 | Variot | |
| 5,593,287 A | 1/1997 | Sadakata et al. | |
| 5,613,844 A | 3/1997 | Tuckey et al. | |
| 5,648,694 A | 7/1997 | Kobayashi et al. | |
| 5,661,894 A * | 9/1997 | Kawasaki et al. | 29/596 |
| 5,695,471 A | 12/1997 | Wampler | |
| 5,697,769 A | 12/1997 | Kobman et al. | |
| 5,758,404 A * | 6/1998 | Baumann et al. | 29/598 |
| 5,782,223 A | 7/1998 | Yamashita et al. | |
| 5,785,013 A | 7/1998 | Sinn et al. | |
| 5,788,210 A | 8/1998 | Mimura | |
| 5,810,568 A | 9/1998 | Whitefield et al. | |
| 5,813,264 A | 9/1998 | Steingroever | |
| 5,842,271 A * | 12/1998 | Kawasaki et al. | 29/732 |
| 5,908,286 A | 6/1999 | Clemmons | |
| 5,920,437 A | 7/1999 | Shirotori | |
| 5,939,807 A | 8/1999 | Patyk et al. | |
| 5,945,766 A | 8/1999 | Kim et al. | |
| 5,949,171 A | 9/1999 | Horski et al. | |
| 5,960,775 A | 10/1999 | Tuckey | |
| 5,961,293 A | 10/1999 | Clemmons et al. | |
| 5,981,921 A | 11/1999 | Yablochnikov | |
| 5,997,262 A | 12/1999 | Finkbeiner et al. | |
| 6,025,665 A | 2/2000 | Poag et al. | |
| 6,028,386 A | 2/2000 | Kech et al. | |
| 6,063,321 A | 5/2000 | Koyama et al. | |
| 6,068,454 A | 5/2000 | Gaston et al. | |
| 6,099,325 A | 8/2000 | Parkhill | |
| 6,102,011 A | 8/2000 | Meyer et al. | |
| 6,106,240 A | 8/2000 | Fischer et al. | |
| 6,124,775 A | 9/2000 | Linkner, Jr. | |
| 6,129,524 A | 10/2000 | Woollenweber et al. | |
| 6,132,184 A | 10/2000 | Robertson et al. | |
| 6,135,730 A | 10/2000 | Yoshioka | |
| 6,149,404 A | 11/2000 | Dobler et al. | |
| 6,161,274 A * | 12/2000 | Stark et al. | 29/596 |
| 6,166,468 A | 12/2000 | Suzuki et al. | |
| 6,177,741 B1 | 1/2001 | Lutkenhaus et al. | |
| 6,179,579 B1 | 1/2001 | Dobler et al. | |
| 6,198,189 B1 | 3/2001 | Takahashi et al. | |
| 6,205,644 B1 * | 3/2001 | Daniels et al. | 29/596 |
| 6,213,734 B1 | 4/2001 | Imhof et al. | |
| 6,231,318 B1 | 5/2001 | Cotton et al. | |
| 6,296,458 B1 | 10/2001 | Zacher et al. | |
| 6,300,169 B1 | 10/2001 | Weiblen et al. | |
| 6,326,748 B1 | 12/2001 | Moroto et al. | |
| 6,333,576 B1 | 12/2001 | Ishikawa et al. | |
| 6,375,381 B1 | 4/2002 | Ruschke et al. | |
| 6,379,254 B1 | 4/2002 | Yablochnikov | |
| 6,443,716 B1 | 9/2002 | Yoshioka | |
| 6,531,688 B2 | 3/2003 | Yablochnikov | |
| 6,543,746 B2 | 4/2003 | Bircann et al. | |
| 6,556,645 B2 | 4/2003 | Kim | |
| 6,616,429 B1 * | 9/2003 | Weber et al. | 418/55.1 |
| 6,652,249 B2 * | 11/2003 | Kenney et al. | 417/410.3 |
| 6,659,737 B2 | 12/2003 | Bader et al. | |
| 6,703,594 B2 | 3/2004 | Yablochnikov | |
| 6,712,585 B2 | 3/2004 | Iehl et al. | |
| 6,722,794 B2 | 4/2004 | Mesaki | |
| 6,734,589 B2 | 5/2004 | Kogure et al. | |
| 6,735,858 B1 | 5/2004 | Schmidt | |
| 6,821,110 B2 | 11/2004 | Carlson et al. | |
| 6,891,137 B2 | 5/2005 | Yablochnikov | |
| 6,918,380 B2 | 7/2005 | Nomura | |
| 6,965,183 B2 | 11/2005 | Dooley | |
| 6,986,648 B2 | 1/2006 | Williams | |
| 7,057,318 B2 | 6/2006 | Strobl et al. | |
| 7,080,787 B2 | 7/2006 | Wulff et al. | |
| 7,097,433 B2 | 8/2006 | Struthers et al. | |
| 7,186,308 B2 | 3/2007 | Metcalf et al. | |
| 7,215,052 B2 | 5/2007 | Blase et al. | |
| 7,394,174 B2 | 7/2008 | Blase et al. | |
| 2001/0033111 A1 | 10/2001 | Choi | |
| 2004/0081566 A1 | 4/2004 | Bader et al. | |
| 2005/0000726 A1 | 1/2005 | Kimata et al. | |
| 2005/0214135 A1 | 9/2005 | Shibuya et al. | |
| 2007/0107475 A1 | 5/2007 | Hill | |
| 2008/0028596 A1 * | 2/2008 | Achor et al. | 29/596 |

* cited by examiner

SYSTEM AND METHOD FOR MANUFACTURING A BRUSHLESS DC MOTOR FLUID PUMP

CROSS REFERENCE TO RELATED APPLICATIONS

None.

BACKGROUND OF THE INVENTION

1. Field of the Invention

The present invention relates to a method for manufacturing a fluid pump having sensitive electronic circuitry for controlling a brushless DC motor.

2. Related Art

Brushless DC motors and fluid pump assemblies incorporating such motors are well known in the art. Generally, fluid pump assemblies include a fluid pump inlet, the motor, an electronic control module and a fluid pump outlet. These components are typically held together and enclosed in a housing. The housing is typically made of a metal or similar material. The fluid pump inlet is in fluid communication with the motor and the motor is in fluid communication with the fluid pump outlet. Generally, fluid such as fuel is ingested by the fluid pump inlet and travels through the motor to the fluid pump outlet where it is delivered to the recipient component of the system such as a vehicle engine.

Conventionally, the fluid pump assembly is formed by placing the components described above into a housing and then the housing is mechanically sealed. Typical mechanical methods such as roll forming, mechanical crimping, and fasteners such as screws and rivets are used to seal the housing. Other methods include welding and sealing the housing to the pump components with adhesives. While these methods of manufacturing fluid pump assemblies achieve there intended purpose, many problems still exist. For example, the methods of manufacturing described above require additional fixturing and more complex manufacturing facilities. Moreover, these methods are require that contact is made with the housing and components, which causes damage to the components, increases cycle times, decreases consistence and increases scrap.

Therefore, it would be desirable to provide a less expensive and less complex manufacturing method to construct a fluid pump assembly as described above. The new and improved method for manufacturing the fluid pump assembly should also reduce the number of components required to seal the housing of the pump assembly. Furthermore, the new and improved method should eliminate manufacturing equipment contact with the components to reduce damage to the components, decrease cycle times, increase metal forming consistence and decrease scrap.

SUMMARY OF THE INVENTION

A system for manufacturing a brushless direct current (BLDC) motor fluid pump is provided, in accordance with an aspect of the present invention. The system includes an electromagnetic forming device, an upper fixture, a lower fixture, and an actuation device (i.e. a pneumatic or hydraulic cylinder). The electromagnetic forming device has a central cavity. The central cavity has a predefined depth from an outer surface of the electromagnetic forming device. The upper fixture is disposed in the central cavity. The upper fixture has a pump stop surface that contacts the BLDC motor fluid pump, and the pump stop surface is selectively spaced from the outer surface of the electromagnetic forming device. The lower fixture has a central cavity that receives the housing of the BLDC motor fluid pump. The actuation device is activated to move the lower fixture towards the upper fixture until the pump stop surface of the upper fixture contacts the BLDC motor fluid pump. The electromagnetic forming device is activated to seal the housing of the pump assembly once the pump assembly is properly positioned within the magneforming device.

In accordance with another embodiment of the present invention, the upper fixture further comprises a plurality of members extending from the upper fixture for contacting the BLDC fluid pump.

In accordance with another embodiment of the present invention, the system further comprises a spacer disposed between the upper fixture and a stationary surface for selectively positioning the pump stop surface from the outer surface of the electromagnetic forming device.

In accordance with another embodiment of the present invention, the central cavity of the electromagnetic forming device has an inside diameter that is larger than an outside diameter of the BLDC motor fluid pump.

In accordance with another embodiment of the present invention, a gap is defined by the inside diameter of the central cavity of the electromagnetic forming device and the outside diameter of the BLDC motor fluid pump.

In accordance with another embodiment of the present invention, the axis of the central cavity of the upper fixture is axially aligned with the axis of the central cavity of the lower fixture.

In accordance with another embodiment of the present invention, the central cavity of the lower fixture has a depth that is selected to position an integral electronic control module in the BLDC motor near an opening of the central cavity.

In accordance with another embodiment of the present invention, a fluid pump and brushless direct current (BLDC) motor assembly for delivering fuel to an engine is provided. The assembly includes an fluid pump inlet for receiving the fluid, a BLDC motor coupled to the fluid pump inlet for generating rotational forces to draw fluid into the assembly, an integral electronic control module in communication with the stator and rotor of the BLDC motor to control the rotation of the rotor, a fluid pump outlet in communication with the electronic control module for receiving and expelling fluid ingested through the fluid pump inlet, and a tubular member made of a deformable conductive material for housing the fluid pump inlet, BLDC motor, integral electronic control module and the fluid pump outlet, and wherein the fluid pump inlet or the fluid pump outlet has a sealing member over which the tubular member is deformed to prevent fluid from leaking between the housing and the fluid pump outlet.

In accordance with another embodiment of the present invention, the fluid pump outlet further comprises the sealing member over which the tubular member is deformed to prevent fluid from leaking between the housing and the fluid pump outlet.

In accordance with another embodiment of the present invention, the fluid pump inlet further comprises the sealing member over which the tubular member is deformed to prevent fluid from leaking between the housing and the fluid pump outlet.

In accordance with another embodiment of the present invention, the sealing member over which the tubular member is deformed is an annular bead.

In accordance with another embodiment of the present invention, the integral electronic control module is disposed between the main body of the BLDC motor and the fluid pump outlet.

In accordance with yet another embodiment of the present invention, a method for manufacturing a brushless direct current (BLDC) motor fluid pump is provided. The method includes providing an electromagnetic forming device having a central cavity, wherein the central cavity has a predefined depth from an outer surface of the electromagnetic forming device, adjusting the depth of the upper fixture disposed in the central cavity, wherein the upper fixture has a pump stop surface for contacting the BLDC motor fluid pump, placing a housing of the BLDC motor fluid pump in a central cavity of a lower fixture, and moving the lower fixture towards the upper fixture until the pump stop surface of the upper fixture contacts the BLDC motor fluid pump using an actuation device such as a pneumatic or hydraulic cylinder.

In accordance with another embodiment of the present invention, adjusting the depth further comprises contacting the BLDC fluid pump with a plurality of members extending from the upper fixture.

In accordance with another embodiment of the present invention, adjusting the depth further comprises moving a spacer disposed between the upper fixture and a stationary surface for selectively positioning the pump stop surface from the outer surface of the electromagnetic forming device.

In accordance with another embodiment of the present invention, placing the housing of the BLDC motor fluid pump further comprises inserting the housing into the central cavity of the electromagnetic forming device wherein the inside diameter of the central cavity is larger than an outside diameter of the housing of the BLDC motor fluid pump.

In accordance with another embodiment of the present invention, the method further includes controlling the gap defined by the inside diameter of the central cavity of the electromagnetic forming device and the outside diameter of the BLDC motor fluid pump.

In accordance with another embodiment of the present invention, the method further includes axially aligning the axis of the central cavity of the upper fixture with the axis of the central cavity of the lower fixture.

In accordance with another embodiment of the present invention, the method further includes selecting the depth of the cavity of the lower fixture to position an integral electronic control module in the BLDC motor near an opening of the central cavity.

BRIEF DESCRIPTION OF THE FIGURES

These and other features and advantages of the present invention will become more readily appreciated when considered in connection with the following detailed description and appended drawings, wherein.

DETAILED DESCRIPTION OF THE PREFERRED EMBODIMENT

Figure 1:
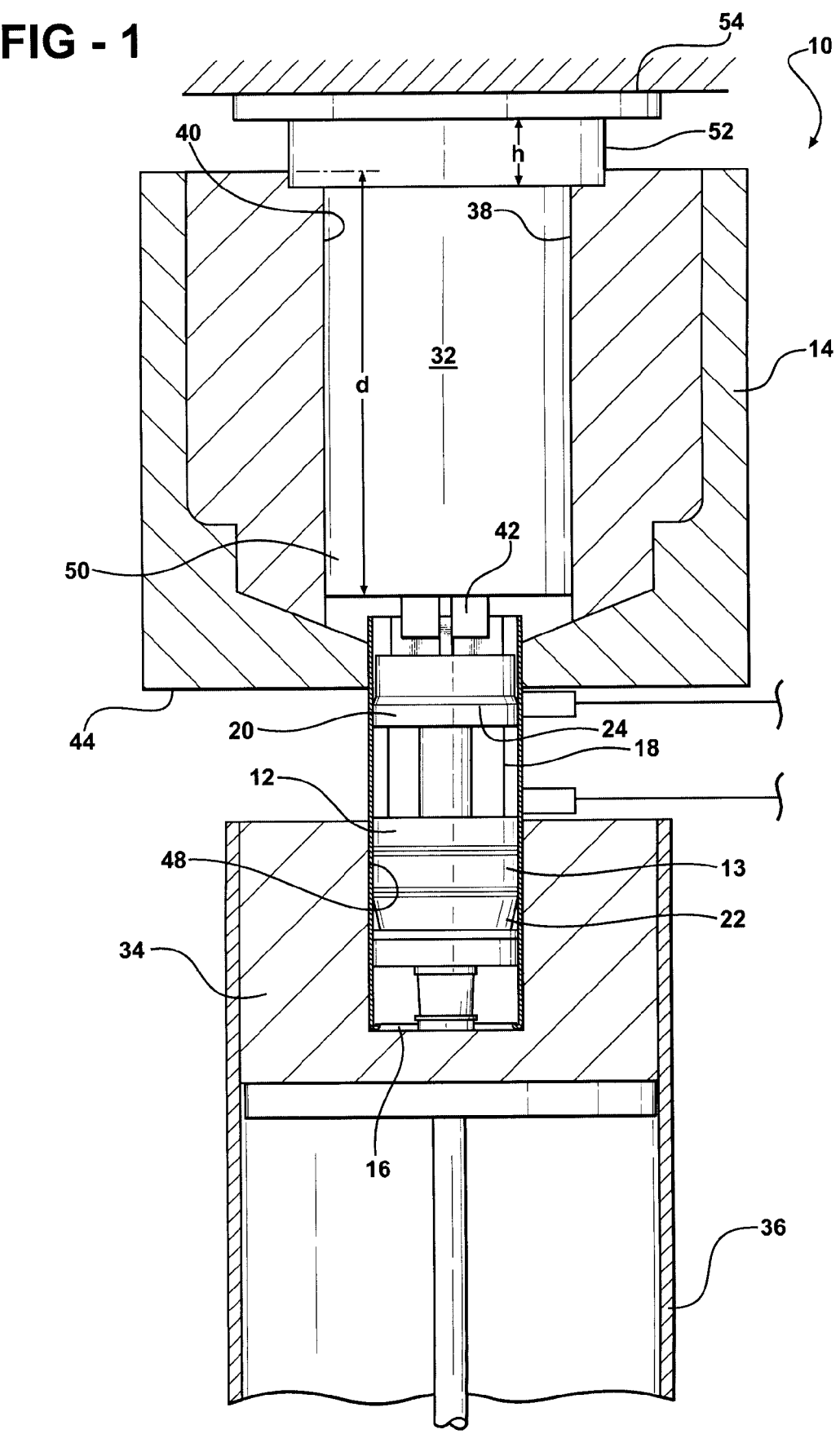
FIG. 1 is a perspective view of the system for manufacturing a brushless DC motor using an electromagnetic forming device, in accordance with an embodiment of the present invention.
Figure 2:
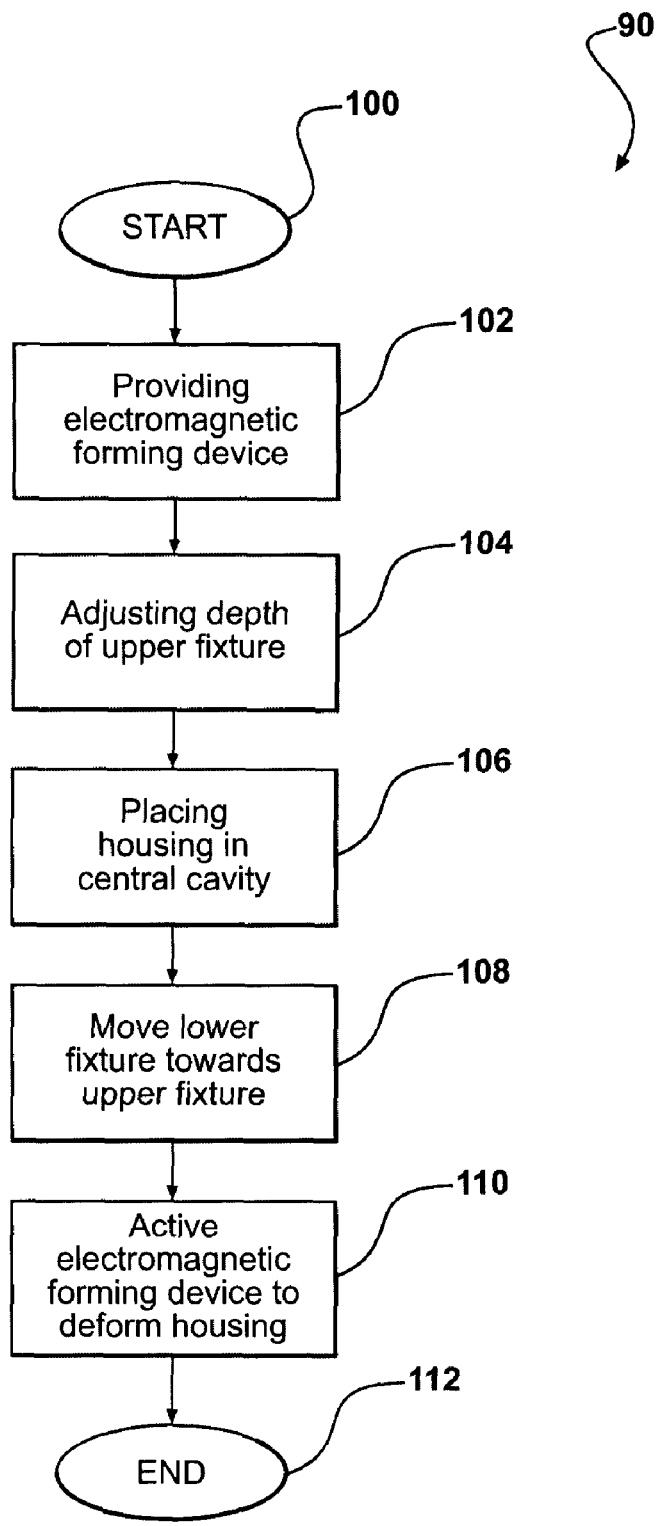
FIG. 2 is a flowchart illustrating a method for manufacturing a brushless DC motor using an electromagnetic forming device, in accordance with an embodiment of the present invention.

Referring now to FIG. 1, a perspective view of a system 10 for manufacturing a brushless DC (BLDC) motor fluid pump 12 using an electromagnetic forming device 14 is shown, in accordance with the embodiment of the present invention. BLDC motor fluid pump 12 includes a BLDC motor 13, an fluid pump inlet 16, an integral electronic control module 18, a fluid pump outlet 20, and a tubular member or pump housing 22. Fluid pump inlet 16 is configured to receive fluid such as engine fuel for internal combustion engines. The BLDC motor 13 is coupled to fluid pump inlet 16 for generating rotational forces to draw fuel into the assembly.

The integral electronic control module 18 is, preferably, disposed between the fluid pump outlet 20 and the BLDC motor 13. Generally, integral electronic control module 18 is in communication with the stator and rotor (not shown) of BLDC motor 13 to control the rotation of the rotor. As conventionally known, the stator winding is energized and de-energized to generate a magnetic field. The magnetic field induced in the stator interacts with the magnets disposed on the rotor to cause rotation of the rotor. Typically, Hall effect sensors in the integral electronic control module 18 are used to sense the position of the magnets disposed on the rotor. However, the present invention contemplates sensor less designs as well. The sensors are used to coordinate the switching of current to the stator with the angular rotation of the magnets on the rotor.

Fluid pump outlet 20 is in communication with the integral electronic control module 18 for receiving and expelling fuel ingested through the fluid pump inlet 16. Tubular member 22 is made of a deformable conductive material and is configured to house fluid pump inlet 16, BLDC motor 13, integral electronic control module 18 and the fluid pump outlet 20.

In one embodiment of the present invention, fluid pump inlet 16 has a sealing member 24 over which the tubular member or housing 22 is deformed to prevent fluid from leaking between the housing 22 and the fluid pump outlet 20. Alternatively, in another embodiment of the present invention, fluid pump outlet 20 has a sealing member 24 over which the tubular member or housing 22 is deformed to prevent fluid from leaking between the housing 22 and the fluid pump outlet 20. Moreover, in an embodiment the present invention, the sealing member 24 over which the tubular member or housing 22 is deformed is an annular bead.

System 10 for manufacturing a brushless direct current (BLDC) motor fluid pump 12 will now be described with reference to FIG. 1, in accordance with an embodiment of the present invention. System 10 includes an electromagnetic forming device 14, an upper fixture 32, a lower fixture 34, and an actuation device 36. Electromagnetic forming device 14 may be any device that is capable of creating a magnetic field that may be controlled and concentrated at a specified location along the housing of the pump assembly. For example, Maxwell Magneform of San Diego, Calif., offers a Maxwell Magneform 16KJ with a ½" field shaper that would be suitable to perform the operations described herein to deform the housing and seal it against the other pump assembly components. Electromagnetic forming device 14 has a central cavity 38. Central cavity 38 has a predefined depth "d" from an outer surface 40 of the electromagnetic forming device 14. Upper fixture 32 is disposed in the central cavity 38. Upper fixture 32 has a pump stop surface 42 that contacts fluid pump outlet 20 of the BLDC motor fluid pump 12. The pump stop surface 42 is selectively spaced from the outer surface 40 of the electromagnetic forming device 14 by positioning upper fixture 32 lower in the electromagnetic forming device 14 or closer to surface 44 of device 14. Lower fixture 34 has a central cavity 48 that is generally cylindrical. Lower fixture 34 is configured to receive housing 22 of the BLDC motor fluid pump 12. Actuation device 36 is a pneumatic or hydraulic cylinder.

Actuation device 36 operates to move lower fixture 34 towards the upper fixture 32 until the pump stop surface 42 of the upper fixture 32 contacts the fluid pump outlet 20 of the BLDC motor fluid pump 12 placing the fluid pump in compression.

In accordance with another embodiment of the present invention, upper fixture 32 has a plurality of members extending from a bottom surface 50 of upper fixture 32 for contacting the fluid pump outlet 20 of the BLDC fluid pump 12. Additionally, a spacer 52 is disposed between the upper fixture 32 and a stationary surface 54. The spacer has a height "h". Spacer 52 is configured to contact upper fixture 32 and stationary surface 54 to position pump stop surface 42 a specified distance from the outer surface 40 of the electromagnetic forming device 14. Pump stop surface 42 may be selectively positioned closer or farther away from surface 44 of electromagnetic forming device 14 as required to allow the pump assembly to move deeper into or farther out of electromagnetic forming device 14. The central cavity 38 of the electromagnetic forming device 14 has an inside diameter that is larger than an outside diameter of the BLDC motor fluid pump 12. However, these diameters are selected to be relatively close in dimension to ensure a relatively high magnetic field strength at the fluid pump outlet 20 of the BLDC motor fluid pump 12. In other words, a relatively narrow annular gap is defined by the inside diameter of the central cavity 38 of the electromagnetic forming device 14 and the outside diameter of the housing 22 of the BLDC motor fluid pump 12. The gap is in the order of between 1/16 to 5/8ths of an inch. Moreover, the magnetic field created by the electromagnetic forming device 14 is controlled to prevent impingement of the magnetic field into the area of the integral electronic control module 18 to prevent damage to sensitive integral electronic devices disposed therein.

To ensure a uniform annular gap between inside diameter of the central cavity 38 of the electromagnetic forming device 14 and the outside diameter of housing 22 of the BLDC motor fluid pump 12, the axis of the central cavity 38 of upper fixture 32 is axially aligned with the axis of the central cavity 48 of the lower fixture 34. Additionally, the central cavity 48 of the lower fixture 34 has a depth that is selected to position the integral electronic control module 18 near an opening of the central cavity 48. The position of integral electronic control module 18 ensures that it will not be subjected to the magnetic field generated by the electromagnetic forming device 14.

In yet another aspect of the present invention a method 90 for manufacturing a brushless direct current (BLDC) motor fluid pump is provided. The method 90 is initiated at block 100. At block 102, an electromagnetic forming device having a central cavity is provided. The central cavity has a predefined depth from an outer surface of the electromagnetic forming device. At block 104, the depth of the upper fixture disposed in the central cavity is adjusted. More specifically, the upper fixture has a pump stop surface for contacting the BLDC motor fluid pump. The depth of the upper fixture in the central cavity is adjusted until the pump stop surface is at a predefined depth from the outer surface of the electromagnetic forming device. The predefined depth, for example, is a depth that positions the pump stop surface at a location within the central cavity that prevents the outlet of the pump assembly from moving further into the electromagnetic forming device. Preferably, the pump stop surface of the upper fixture is positioned within the electromagnetic forming device such that pump stop surface contacts the fluid pump outlet of the pump assembly to position the control module having the sensitive control electronics outside of the electromagnetic forming device. At block 106, a housing of the BLDC motor fluid pump is placed in a central cavity of a lower fixture. At block 108, the lower fixture is moved towards the upper fixture until the housing of the pump assembly moves into the electromagnetic forming device and the pump stop surface of the upper fixture contacts the fluid pump outlet of the BLDC motor fluid pump assembly. For example, an hydraulic cylinder is actuated to move the lower fixture towards the upper fixture. At block 110, the electromagnetic forming device is activated to deform the housing over a sealing member disposed in the fluid pump outlet. Preferably, the housing is an electrically conductive material such as aluminum and the sealing member is an annular bead formed of the same material as the outlet member, i.e., a polymer.

In an embodiment of the present invention, the upper fixture includes a plurality of members that extend from a lower surface of the upper fixture to contact the fluid pump outlet of the pump assembly. The plurality of members are configured to correspond with the contoured surfaces of the fluid pump outlet. In yet another embodiment of the present invention, a spacer is disposed between the upper fixture and a stationary surface for selectively positioning the pump stop surface from the outer surface of the electromagnetic forming device. The spacer is made of metal or similar material. The present invention contemplates changing the depth of the upper fixture in the central cavity by changing the thickness of the spacers disposed between the upper fixture and a stationary surface.

The method of the present invention further contemplates controlling the strength of the magnetic field produced by the electromagnetic forming device and required to deform the housing over the annular bead by controlling the gap defined by the inside diameter of the central cavity of the electromagnetic forming device and the outside diameter of the BLDC motor fluid pump. A smaller gap allows the use of a lower strength magnetic field to deform the housing over the annular bead. A lower strength magnetic field prevents damage to the sensitive control electronics disposed in the electronic control module. Preferably, the axis of the central cavity of the upper fixture is axially aligning with the axis of the central cavity of the lower fixture. Further, to ensure that the electronics disposed in the control module are not damaged, the electronic control module in the BLDC motor assembly is, preferably, positioned near an opening of the central cavity.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for manufacturing a brushless direct current (BLDC) motor fluid pump having an internal electronic control module (18), the method comprising the steps of:

providing an electromagnetic forming device (14) having a central cavity (38) and an outer surface (44) generally coinciding with an opening to the central cavity (38);

providing an upper fixture (32) having at least one pump stop surface (42) disposed at an axially distal end thereof;

encapsulating the upper fixture (32) within the central cavity (38) of the electromagnetic forming device (14), such that the pump stop surface (42) is recessed within the central cavity (38) and does not extend out of the central cavity (38) beyond the outer surface (44) of the electromagnetic forming device (14);

providing a lower fixture (34) aligned directly below the upper fixture (32), the lower fixture (34) including a central cavity (48) having an opening therein facing toward the central cavity (38) of the electromagnetic forming device (14);

providing an actuation device (36) operatively associated with at least one of the upper (32) and lower (34) fixtures to move the upper (32) and lower (34) fixtures toward one another;

providing a partially assembled BLDC motor fluid pump assembly, the BLDC motor fluid pump assembly having a generally tubular housing (22) extending between upper and lower axially spaced ends thereof, an inlet portion (16) disposed inside the housing (22) adjacent the lower end thereof, a BLDC motor (13) disposed inside the housing (22), a pumping unit (12) disposed inside the housing (22), an electronic control module (18) disposed inside the housing (22), and an outlet portion (20) disposed inside the housing (22) adjacent the upper end thereof, the outlet portion (20) being positioned axially between the electronic control module (18) and the upper end of the housing (22);

supporting the lower end of the housing (22) of the partially assembled BLDC motor fluid pump assembly into the central cavity (48) of the lower fixture (34); said step of supporting the lower end of the housing (22) of the partially assembled BLDC motor fluid pump assembly into the central cavity (48) of the lower fixture (34) including preventing the portion of the housing (22) surrounding the electronic control module (18) from entering into the central cavity (48) of the lower fixture (34) during said energizing step;

positioning the upper end of the housing (22) of the partially assembled BLDC motor fluid pump assembly into the central cavity (38) of the electromagnetic forming device (14) until the pump stop surface (42) of the upper fixture (32) directly engages the end piece (16, 20) of the partially assembled BLDC motor fluid pump assembly;

said positioning step including controlling the axial dimension between the pump stop surface (42) and the outer surface (44) of the electromagnetic forming device (14) so that the electronic control module (18) does not pass through the outer surface (44) nor enter into the central cavity (38); said step of controlling the axial dimension between the pump stop surface (42) and the outer surface (44) including moving the actuation device (36) relative to the upper fixture (32); said step of controlling the axial dimension between the pump stop surface (42) and the outer surface (44) further including moving a spacer (52) disposed between the upper fixture (32) and a stationary surface (54);

energizing the electromagnetic forming device (14) to deform and constrict only the portion of the housing (22) contained within the central cavity (38) but not the portion of the housing (22) surrounding the electronic control module (18) to thereby compress the upper end portion of the housing (22) against the end piece (16, 20) and establish a fluid tight seal therebetween without subjecting the electronic control module (18) to constriction forces; and further including installing a sealing member (24) between the housing (22) and at least one of the inlet (16) and outlet (20) portions.

\* \* \* \* \*